United States Patent Office 2,948,638
Patented Aug. 9, 1960

2,948,638

COATED VINYL CHLORIDE PLASTISOL RESIN PARTICLES COATED WITH A CARBOXYLIC ACID SALT AND METHOD OF PREPARATION

Blake Orval Baird, Bay Village, Ohio, and Robert P. Davie, St. Albans, W. Va., assignors to The B. F. Goodrich Company, New York, N.Y., a corporation of New York No Drawing. Filed Oct. 12, 1956, Ser. No. 615,461

11 Claims. (Cl. 117—100)

The present invention relates generally to finely granular vinylidene halide resins. More particularly, the invention relates to finely granular vinyl chloride and vinylidene chloride resins of the paste- or plastisol-types which have been surface-treated to improve their rheological characteristics in non-aqueous systems and stabilize them against degradation by heat and light.

Polymers of vinyl chloride and/or vinylidene chloride, with or without other vinyl or vinylidene comonomeric materials, have been produced in finely granular forms for use in plastisols, organosols and hydrosols. For use in plastisols, for example, these polymers are made in the form of particles less than about 1 or 2 microns in diameter. Such materials can be stirred by hand into plasticizers to form smooth plastisol compositions which are employed in the production of finished articles by dipping, molding, spreading and other techniques. For each of these various uses the plastisol should have a correct apparent or plastic viscosity and a certain yield point; in some uses it should have certain high and/or low shear rate viscosities; other uses require a certain degree of thixotropy; and in most commercial applications the rheological characteristics of the plastisol should not change appreciably upon standing. In the past many additives have been employed in plastisol formulations to modify, improve, adjust or stabilize one or more of these rheological characteristics to suit particular applications. It has been particularly difficult, for example, to produce a plastisol formulation having both a reasonable apparent viscosity (flow rate) and a high yield point, in the usual case the flow rate seeming to increase proportionately with increased yield point. In most cases the plastisol formulation has had to be consumed within a reasonable time after preparation because its viscosity tends to increase considerably with passage of time.

Plastisol resins, such as polyvinyl chloride plastisol resins, generally are of inferior stability as compared to the general purpose types of resins. At least to some extent, this is due to the fact that plastisol resins are made by aqueous emulsion polymerization techniques while the general purpose resins are usually made by suspension techniques. Furthermore, since plastisol resins ordinarily are not subjected to mastication or other treatments involving high shear, it is difficult to disperse many of the best stabilizers with the same degree of efficiency as is obtained during high temperature mastication. Accordingly, plastisol resins have been of more limited application than is desirable.

According to the present invention, however, it has been discovered that the finely granular vinyl chloride polymers can be surface treated to modify their rheological characteristics in non-aqueous systems such as plastisols and organosols. The surface-treatment of this invention comprises a thin coating on the surface of the particles of a salt of a carboxylic acid of the class defined below. Finely granular vinyl chloride resins, for example, polyvinyl chloride containing discrete particles finer than about 5 microns, treated in this fashion exhibit novel rheological characteristics in non-aqueous media such as plasticizers. The effects of the salt coating is in many cases opposite to the effects of the same salt in aqueous resinous compositions. For example sodium polyacrylate, a preferred salt, generally thickens aqueous resinous compositions. Plastisol formulations containing fine polyvinyl chloride particles coated with sodium polyacrylate, on the other hand, are stabilized against viscosity increase on long standing; their high and low shear rate viscosities are sometimes reduced by as much as 10 to 30 percent or more; they are sometimes less and sometimes more thixotropic; and they have higher yield points at lower apparent viscosities. The coated resins of this invention, moreover, have vastly increased resistance to degradation by heat and light. In addition, the coated resins are more efficiently plasticized by conventional plasticizers and have improved physical properties. The coated granular polymers of this invention thus are more useful and are of wider general applicability in non-aqueous plastisol and organosol formulations.

The surface coating of this invention is applied by a method comprising two essential steps: (1) preparing a suspension or dispersion of a finely granular polymer in a liquid medium containing a dissolved or dispersed salt of the class described and (2) removing the liquid from the suspension or dispersion in such a manner as to deposit the salt on the surface of the resin particles in the form of a substantially uniform coating. As applied herein to the carboxylic acid salt, the term "dispersed" means that the salt may be dissolved in the liquid suspension medium, or dispersed or suspended therein in a suitably finely-divided or colloidal state so as to be deposited, on drying, in a more or less uniform film or coating on the particles. As applied to the resin particles, the latter term can mean either mere physical suspension or true colloidal suspension or dispersion. In a preferred procedure, the coating is applied during the resin manufacturing process at any stage therein (subsequent to polymerization) wherein the polymer is present as discrete particles of the correct size suspended or dispersed in an aqueous medium in a substantially unagglomerated condition. The carboxylic acid salt is merely added to the polymer suspension and the water abstracted.

The coating may also be applied to already-formed, dry plastisol-type polymers by a re-slurrying technique wherein the finely granular polymer is added to an aqueous medium so as to form a dispersion or suspension. The salt may be present in the medium when the resin is added or it may be added later. Spray drying of the resulting suspension or dispersion will form a coated polymer of improved plastisol viscosity characteristics, improved physical properties and greatly improved heat and light stability. The application of the coating may produce some agglomeration of the fine resin particles and these agglomerates can be broken down by grinding the dry resin, or the plastisol containing the agglomerated resin can be ground with plasticizers in an ink mill to break up the agglomerates. Because of this tendency of a vinyl resin to agglomerate slightly on drying it is best to apply the salt coating to the resin particles before they are dried for the first time. Once the coating is applied agglomeration and regrinding seems to have less adverse effects on the rheological properties and stability of the resin in non-aqueous systems than if the resin is coated in the agglomerated condition and then reground.

The drying step can be carried out by any method that abstracts the water or liquid from the suspension without loss or non-uniform distribution of the dissolved or dispersed salt. Thus, drying may be accomplished by suspending the resin-salt dispersion in warmed air, it can be placed in trays or pans and warm air passed over it, or a vacuum tray drier may be employed. Drying may also be carried out in apparatus which tumbles or agitates the suspension so as to insure uniformity in the final product. Temperatures employed in drying are not critical and may be those conventionally employed in drying the particular vinylidene halide resin employed. Spray drying (drying in an atomized condition), however, is much preferred.

The base resin to which the coating is applied should be very finely granular or else the resin will be unfit for plastisol use (and the effects of the coating lost) and the salt will not be sufficiently well dispersed in a fused product to stabilize the resin. For these purposes the resin should be composed of particles finer than about 5 microns and preferably less than about 2 microns. This does not mean that the resin may not contain a small proportion of particles coarser than about 5 microns. Many plastisol resins do contain a small proportion of such particles (or agglomerates) although the great preponderance of their particles usually are below 1 or 2 microns in size and very few coarser than 5 microns. In many cases, where clarity is not essential, a small proportion of polymer having particles up to 100 to 200 microns is added to reduce plastisol viscosity. The term "finely granular" does, however, mean that the great preponderance of the resin particles is finer than about 5 microns.

The terms "vinyl chloride polymer" or "vinyl chloride resin," as used herein, includes any resin derived from a monomeric material containing at least 90% by weight of vinyl chloride.

Other monomeric materials, in addition to the vinyl chloride, may be employed to produce the resin to be treated according to this invention including one or more other monomers such as vinyl acetate, vinyl benzoate, the acrylic acids such as acrylic acid and methacrylic acid and their esters, nitriles and amides, vinyl methyl ketone, vinyl pyridine, ethylene, isobutylene and other similar materials. These other comonomeric materials usually should not be present in excess of about 10 percent by weight in order to produce a resin useful in typical plastisol and organosol formulations. Better results are obtained with vinyl chloride polymer made from mixtures containing more than 95 percent vinyl chloride. Best results have been obtained with high molecular weight polyvinyl chloride.

Any salt of a carboxylic acid containing from 3 to 8 carbon atoms can be employed in the production of the resins of this invention. Thus there may be employed salts of saturated monocarboxylic acids from propanoic to octanoic (caprylic) acids; of saturated polycarboxylic (i.e. 2 or more carboxyl groups) acids such as malonic acid, succinic acid, tartaric acid, glutaric acid, adipic acid, pimelic acid, suberic acid, glutamic acid, gluconic acid, citric acid and many others; of aromatic mono- di- and polycarboxylic acids such as benzoic acid, salicyclic acid, phthalic acid, and others; of unsaturated mono- and dicarboxylic acids, particularly the alpha-beta unsaturated acids, such as acrylic acid, methacrylic acid, itaconic acid, crotonic acid, chloro-, bromo- and cyano acrylic acids, vinyl acrylic acid, maleic acid, polymeric forms of these and other unsaturated acids or their anhydrides wherein the acid or anhydride constitutes at least 50 mol percent of the polymer and many others; and any substituted carboxylic acid containing hydroxyl groups, epoxy groups, amide groups, nitrile groups, alkoxy groups, ester groups, ketone groups and the like. Examples of substituted acids which can be employed in the form of their salts are citric acid and beta-alanine.

Particularly good results are obtained with the salts of two of the above sub-groups of acids, namely, (1) the monomeric and polymeric salts of 3 to 8 carbon atom alpha-beta unsaturated acids (i.e. acrylic type acids) and (2) the 3 to 8 carbon atom polycarboxylic acids (as above defined), such as itaconic acid, succinic acid, adipic acid, citric acid, tartaric acid, and the like. Greatly preferred because of their ease of incorporation are the water-soluble salts of the 3 to 8 carbon atom polycarboxylic acids.

Any salt or partial salt (partially neutralized) of the carboxylic acid can be employed in the coating on the particles. Thus, there may be employed any of the water-soluble alkali-metal (including sodium, potassium, and lithium) salts or any of the polyvalent metal salts, such as those of calcium, barium, cadmium, lead, tin, zinc, strontium and other metallic salt-forming elements and others. Where the carboxylic acid salt is soluble in water it is merely dissolved in an aqueous resin suspension. Where the salt is insoluble or sparingly soluble in aqueous media the salt can be dispersed or suspended in the aqueous medium. Thus, though sparingly soluble, many of the monomeric polyvalent metal salts of acrylic acids are easily dissolved and/or suspended in the resin suspension due to the relatively large volume of water present and the small amount of salt usually employed. When the salt is added to the aqueous suspension or dispersion as obtained from the polymerization, there may be present sufficient emulsifier residues to aid in suspending or dispersing the small quantities of the less soluble salts. If desired, the less soluble salts may be dissolved in a solvent and the resulting solution converted to emulsion form with the aid of emulsifiers and the resulting fine dispersion then added to the resin suspension. Since some of the polyvalent metal carboxylic acid salts have a tendency to coagulate aqueous resin dispersions, small amounts of metal chelating agents such as "Versene" (ethylene diamine tetratcetic acid and its alkali metal salts) may be added to stabilize the dispersion until it can be spray dried.

Illustrative salts which may be utilized are any of the water-soluble salts of acrylic acids including sodium acrylate, sodium polyacrylate, potassium polyacrylate, lithium polyacrylate, barium acrylate, zinc acrylate, calcium acrylate, cadmium acrylate, lead acrylate, tin acrylate, and others, sodium polymethacrylate, calcium methacrylate, barium methacrylate, cadmium methacrylate, zinc methacrylate, tin methacrylate, lead methacrylate, sodium crotonate (sodium salt of beta-methyl acrylic acid), sodium itaconate (mono- and disodium salts of alpha-aceto acrylic acid), sodium cinnamate, and similar salts of other substituted acrylic acids. Also employed to good advantage are sodium propionate, sodium succinate, potassium succinate, sodium nitrate, sodium maleate, and many others.

Preferred, from the standpoint of performance, cost, and convenience in handling, are the water-soluble alkali-metal salts of polyacrylic acids including those of sodium, potassium, and lithium. The particular salt to be employed sometimes will depend, however, on the particular property or properties to be improved or modified. For example, it appears that the sodium salt of polyacrylic acid and calcium acrylate are the most effective of the acrylic acid type salts in increasing plastisol yield value without a proportionate increase in apparent viscosity (flow rate). Likewise, the calcium acrylate salt appears slightly more effective than the sodium salt in decreasing the low shear rate viscosity but sodium polyacrylate appears most effective in decreasing the high shear rate viscosity. In a similar fashion calcium acrylate appears to be most effective in stabilizing plastisol viscosity on standing. As regards the resistance to heat and light, sodium succinate, sodium itaconate, sodium citrate, sodium crotonate, barium acrylate, zinc acrylate and sodium polyacrylate appear to be most effective. In some cases the presence in the salt coating of more than one carboxylic acid salt is more effective than any of the same salts used alone.

Preferred for their efficiency as stabilizers are the water-soluble alkali-metal salts of crotonic, itaconic, succinic, and citric acids.

The weight or thickness of salt coating required is simply that required to produce the result desired and, in general, this amount is quite small. In most cases the presence in the coating of at least 0.1 percent by weight of a salt, based on the weight of vinylidene halide resin, is required to significantly affect the plastisol rheological characteristics or stability of the resin. As the weight of the coating is increased up to about 1 percent, further improvement is usually obtained. Further increases in the weight of the coating may not result in further desirable modification in rheological properties, or improvement in heat and light stability, although up to 3, 5 or 10 percent may be employed, if desired, to improve the plasticization of the resin itself. For most purposes between about 0.1 and about 0.6 percent usually will be found sufficient.

The invention will now be more fully described with reference to several specific examples. Unless otherwise specified, proportions are expressed as parts by weight per 100 parts by weight of vinylidene halide resin, or percent by weight based on the resin.

*Example 1*

A latex-like dispersion resulting from the aqueous emulsion polymerization of vinyl chloride, containing about 30 to 35 percent total solids and containing polyvinyl chloride particles finer than about 1 or 2 microns in diameter (a preponderant proportion of the particles in this resin are between 0.3 and 0.8 micron) is employed in this example. To separate portions of this resin dispersion quantities of a solution of low molecular weight sodium polyacrylate (containing about 25 percent total solids) are added with mixing. Sufficient is utilized to make 0.3 percent, 1 percent and 3 percent sodium polyacrylate based on the polyvinyl chloride resin. The resulting polyacrylate-containing dispersions are then spray dried to produce fine, dry resinous powders. The resulting powdery resins are reground to break up the agglomerates formed in the spray drying operation and substantially restore the original particle size of the resin.

The reground powders are then each mixed by hand for ten minutes with 75 parts of a commercial dioctyl phthalate type plasticizer (known as "GP-261") per 100 parts of the coated resin. Each plastisol formulation is then mixed for an additional 30 minutes on a "Delta" mixer and then deaerated for 30 minutes to produce smooth plastisols. The rheological characteristics of each of the resulting plastisol formulations are then compared to those of a control plastisol made in a similar fashion from the same polyvinyl chloride resin but having no coating thereon. The viscosity values are determined by means of the Brookfield Synchro-lectric Viscosimeter, model HVT, #5 spindle, at various speeds ranging from 2 to 20 r.p.m. and the Brookfield Viscosimeter, model LVF, #4 spindle, after aging for 1 day and after aging for 14 days. The adjusted and calculated viscosity values are as follows:

| Value | Control | 0.3% Sodium Polyacrylate | 1.0% Sodium Polyacrylate | 3% Sodium Polyacrylate |
|---|---|---|---|---|
| $f$ (yield) | 0 | 75 | 50 | 0 |
| $a$ (low speed shear viscosity) | 2200 | 2680 | 3900 | 8400 |
| $b^*$ (dilatency) | 1.14 | 1.12 | 1.07 | 1.04 |
| M (thixotropy) percent | 10.4 | 11.4 | 10.8 | 15.2 |
| $V_{10}^{**}$ (1 day) | 3420 | 3810 | 4730 | 9600 |
| $V_{10}^{**}$ (14 days) | 6470 | 6720 | 7150 | 12,800 |
| $^1\Delta v_{10}^{**}$ percent | 89 | 77 | 51 | 33 |
| $^1\Delta v_{100}^{**}$ percent | 50 | 41 | 27 | 32 |
| $^1\Delta v_{250}^{**}$ percent | 37 | 4 | 17 | 29 |
| $^1\Delta v_{600}^{**}$ percent | 23 | -11 | -10 | 29 |

\* As values approach 1.0 dilatency decreases.
\*\* $V_{10}$—Viscosity at 10, 100, 250 and 600 r.p.m., etc.
[1] Increase in viscosity over 14-day period.

As will be seen in the above data, the sodium polyacrylate coating exerts a pronounced influence on most of the rheological properties of the plastisol. Yield values are increased without correspondingly large increases in viscosity and the viscosity does not increase as rapidly as the control upon aging. When the plastisol is ink-milled, these effects of the salt coating are even more strongly accentuated, as will be seen in Example II below.

Thin films 0.020 inch thick are cast from the plastisols of Example I above and fused 4 minutes at 177° C. The films prepared from the coated resin are water white and as clear or clearer than control films made from uncoated control polymer. The resulting films are then tested for heat and light resistance and for physical properties. The heat resistance is determined both at 177° C. and at 204° C. as indicated by light transmission units measured on the Photovolt Electrophotometer. Light stability is evaluated on a fadeometer, the film samples being exposed to ultraviolet light and the time (fading hours) observed for both initial and complete breakdown. The sodium polyacrylate stabilized plastisol films are compared to (1) an unstabilized, uncoated control, (2) a control of uncoated resin to which 2 percent on the resin of a commercial organo-tin stabilizer known as "S-52" (believed to be dibutyl tin methoxy methyl maleate polymer) has been added along with the plasticizer, and (3) several samples prepared from polyacrylate-coated resin to which 2 percent of "S-52" has been added to the plasticizer. The data are as follows:

| Sodium Polyacrylate Content | (Control) 0% | 0.3% | 1% | 3% | (Control) 0% (2% S-52) | 0.3% (2% S-52) | 1% (2% S-52) | 3% (2% S-52) |
|---|---|---|---|---|---|---|---|---|
| Heat Stability at 177° C. (Light Transmission Units): | | | | | | | | |
| 5 min | 64 | 65 | 65 | 65 | 66 | 66 | 67 | 64 |
| 10 min | 35 | 63 | 58 | 58 | 65 | 65 | 66 | 64 |
| 15 min | 7 | 55 | 56 | 55 | 65 | 67 | 67 | 63 |
| 20 min | 5 | 46 | 47 | 47 | 57 | 63 | 64 | 59 |
| 30 min | 5 | 21 | 29 | 32 | 24 | 52 | 53 | 50 |
| 45 min | 5 | 6 | 17 | 23 | 6 | 39 | 40 | 35 |
| 60 min | | | 8 | 17 | | 26 | 25 | 29 |
| 90 min | | | 6 | 10 | | 7 | 15 | 19 |
| at 204° C.: | | | | | | | | |
| 5 min | 39 | 65 | 63 | 60 | 68 | 68 | 67 | 63 |
| 10 min | 6 | 35 | 34 | 41 | 60 | 61 | 64 | 55 |
| 15 min | 5 | 5 | 9 | 9 | 6 | 40 | 34 | 34 |
| 20 min | | | 5 | 5 | 4 | 6 | 8 | 7 |
| 30 min | | | | 7 | | 6 | | |
| 45 min | | | | 6 | | | | |
| Light Stability: | | | | | | | | |
| at 0 Fading Hours | ←——————————————————— Water White-Clear ———————————————————→ | | | | | | | |
| Initial Breakdown: | | | | | | | | |
| First Change Noted at Fading Hours | 60 | 140 | 140 | 180 | | | | |
| Condition at 300 Hours | Complete Breakdown Brittle Black. | Tacky Yellow. | Tacky Yellow. | Brown Spots. | No color. | No color. | No color. | No color. |

In the heat and light stability data given above it should first be noted that as little as 0.3 percent sodium polyacrylate is almost as effective as 2 percent of "S–52," the latter being a commonly used organic-tin stabilizer for clear films. On a cost basis, the cost of the sodium aerated for 30 minutes. The viscosities after 1- and 14-day aging periods and the heat and light stabilities of 0.020 inch films (fused at 177° C. for 4 minutes) are determined according to the procedures described in Example I. The data are as follows:

| Brookfield Viscosities Model RVF | Control | 0.3% Sodium Polyacrylate | 0.6% Sodium Polyacrylate | 0.3% Calcium Acrylate | 0.6% Calcium Acrylate | 0.3% Zinc Acrylate |
|---|---|---|---|---|---|---|
| Aged 1 day: | | | | | | |
| $V_L$ (c.p.s.) | 18,000 | 15,000 | 19,000 | 17,000 | 16,000 | 16,000. |
| $V_H$ (c.p.s.) | 10,600 | 8,200 | 9,000 | 8,600 | 9,600 | 8,600. |
| Yield | 200 | 360 | 780 | 360 | 500 | 220. |
| Aged 14 days: | | | | | | |
| $V_L$ (c.p.s.) | 27,000 | 23,000 | 24,000 | 21,000 | 21,000 | 27,000. |
| $V_H$ (c.p.s.) | 24,200 | 11,800 | 15,000 | 20,200 | 21,000 | 15,800. |
| Yield | 1,920 | 940 | 1,380 | 1,300 | 1,680 | 1,140. |
| Heat Stability at 177° C.: | | | | | | |
| 5 min | 59 | 64 | 66 | 59 | 47 | 69. |
| 10 min | 14 | 58 | 61 | 55 | 45 | 65. |
| 15 min | 5 | 46 | 49 | 45 | 38 | 2. |
| 20 min | 4 | 31 | 40 | 31 | 26 | 2. |
| 30 min | 3 | 18 | 24 | 8 | 8 | 2. |
| Light Stability: | | | | | | |
| Initial Breakdown (Fading Hours): | 40 | 180 | 180 | 140 | 160 | No Color. |
| at 300 Hours | Black—failed at 200 Hours. | Brown spots. | Yellow spots. | Partially black. | Partially black. | No Color. |
| at 500 Hours | | | | | | No Color. | polyacrylate treatment appears to be about 3 percent of that of most of the conventional tin-organic or cadmium-organic stabilizing compounds. The second important feature of the stabilizing activity of sodium polyacrylate is that its effect is additive and does not seem to interfere with the normal action of other stabilizers permitting the production and sale of a pre-stabilized plastisol resin which the purchaser can formulate in any way he desires.

*Example II*

Further samples of sodium polyacrylate coated polyvinyl chloride resin are prepared using the materials and method of Example I except that the regrinding step is omitted. Coated resins are prepared in this fashion containing 0.3 and 0.6 percent sodium polyacrylate. For purposes of comparison several coated resins are prepared in which 0.3 percent and 0.6 percent calcium acrylate and 0.3 percent and 0.6 percent of zinc acrylate are substituted for the sodium polyacrylate. In the preparation of the latter polymers the required amounts of liquid, monomeric calcium acrylate or zinc acrylate are added, as such, directly to the polymerization dispersion together with mixing. The dispersions then are spray dried. Since the dispersions contain catalyst and emulsifier residues, it is not known whether the calcium and zinc acrylates are present in the coating as the monomer, as the polymer, or both. The coating on the resin, whatever its structure, is believed to be uniform in view of the excellent plastisol viscosity characteristics and heat and light stability of the coated resins. The monomeric polyvalent metal salts either dissolve in the large volume of the dispersion or are dispersed therein due to the residual emulsifier and dispersing agents or the relatively large surface area of the fine, colloidal resin particles suspended therein. In any case fine, powdery coated resins are obtained that do not differ in appearance from those made with sodium polyacrylate.

Plastisols are then made by hand mixing 55 parts of dioctyl phthalate plasticizer ("GP–261") with 100 parts of coated resin. After initial hand mixing for 5 minutes the plastisols are given four tight passes through an "Ink-Mill" to a North fineness of 8. At this point 20 additional parts of the same plasticizer are added to each plastisol and the plastisol then mixed for an additional 10 minutes on a "Delta" mixer. This procedure is followed because the coated resin was not reground after spray drying. Finally, all of the plastisols, including a control containing uncoated polymer, are de- In the above viscosity data it will be noted that all of the plastisols are of higher viscosity than those of the preceding example. The reason for this is believed to be the ink-milling that the samples of Example II received, the milling increasing the dispersion or improving the resin-plasticizer contact. However, the metal acrylate salts very significantly improve the stability of the plastisol, the 14-day increase in the Brookfield viscosity values of the plastisols containing sodium polyacrylate coated resin being 81 percent less than that of the control, that of the calcium acrylate coated resin being 83 percent less, and that of the zinc acrylate coated resin being 51 percent less. Moreover, initial yield values are increased (without significant increase in viscosity) by a factor of about 80 percent for sodium polyacrylate and calcium acrylate and by about 10 percent for zinc acrylate. Similarly, while all of the acrylate salt coatings decrease both the low ($V_L$) and high shear rate ($V_H$) viscosities, only the sodium polyacrylate coatings decrease thixotropy while the calcium acrylate and zinc acrylate coatings increased this property (at both levels).

In the heat and light stability data of Example II it can be seen that all of the coated resins possessed markedly improved heat and light stability, zinc acrylate being especially effective as a light stabilizer even after 500 hours of exposure in the fadeometer.

*Example III*

In a similar fashion the polyvinyl chloride plastisol resin employed in Examples I and II is variously coated with 0.45 percent barium acrylate, 0.45 percent cadmium acrylate, 0.45 percent tin acrylate, 1.0 percent tin acrylate, 0.45 percent lead acrylate, a combination of 0.225 percent sodium polyacrylate and 0.225 percent zinc acrylate, a combination of 0.225 percent calcium acrylate and 0.225 percent cadmium acrylate, 0.45 percent calcium acrylate, and 0.45 percent sodium polyacrylate. The monomeric acrylate salt in each case, is added to the latex (as obtained from the polymerizer) according to the procedure of Example II. Plastisols, prepared according to the procedure of Example II, are compared for plastisol viscosities and heat and light stabilities against controls prepared from uncoated resin, some of which contained 0.45 percent of organo-tin stabilizers, and also against controls prepared from blends of equal parts of coated and uncoated resin.

Due apparently to the increased weight of coating (0.45%) and the ink-milling procedure, it was noted that most of the resulting plastisols are more viscous than the control and have yield values varying from about 200 to about 4500 (control —80 to 100). The plastisols prepared from the zinc acrylate, tin acrylate and lead acrylate coated resins are least viscous and show smaller increases in viscosity upon a 14-day aging cycle than the controls or those containing the other coated resins. It is also noted that the plastisols prepared from the blended resins have high yield values (580 to 4560). Likewise, the plastisol prepared from the resin having the mixed sodium polyacrylate and zinc acrylate coating also has a high yield value (1050).

In all cases thin films cast from the plastisols containing the coated resins of Example III are clear and water-white while the films prepared from the control plastisols containing dibutyl tin methoxy methyl maleate polymer or a tin mercaptide are slightly cloudy. All films prepared from coated polymer are more resistant to heat and light than the uncoated, unstabilized control. Heat stability values are listed below in order of decreasing effectiveness.

| Rating | Coating | Percent Breakdown/ 5 Minutes at 177° C. |
|---|---|---|
| 1 | RS-31 [1] | 2 |
| 2 | Barium acrylate | 7 |
| 3 | Calcium acrylate+cadmium acrylate | 12 |
| 4 | Sodium polyacrylate | 14 |
| 5 | Sodium polyacrylate+zinc acrylate | 19 |
| 6 | Lead acrylate | 21 |
| 7 | S-52 [2] | 22 |
| 8 | Tin acrylate (1%) | 24 |
| 9 | Control | 53 |
| 10 | Zinc acrylate | 80 |

[1] A tin mercaptide.
[2] Dibutyl tin methoxy methyl maleate polymer.

All the films except those prepared from zinc acrylate coated resin are more stable to heat than the control (zinc acrylate coated resin, however, is most resistant to light).

All of the coated resins of Example III are much more stable to light than the unstabilized control which shows initial breakdown in 40 hours and failure in 260 fading hours. None of the acrylic salt stabilized films fails in 300 hours and the sodium polyacrylate stabilized films, the barium acrylate films, and the zinc acrylate films do not develop color in 300 hours. In this respect the acrylic acid salt coatings, and particularly the zinc acrylate coatings, approach those of the tin mercaptide films in their stabilizing effects. The latter material is one of the most effective tin-containing stabilizers, but it is much more expensive than acrylic salts and imparts a slight cloudiness and objectionable odor to the films. Thus, the acrylic acid salt coatings approach the best tin stabilizers in both heat and light stabilizing effectiveness, are much lower in cost, and appear to produce films of superior clarity.

Example IV

A commercial grade of polyvinyl chloride plastisol resin having particles finer than about 1 or 2 microns is slurried in water containing 3 percent by weight of a low molecular weight sodium polyacrylate using rapid mechanical agitation to disperse the resin. The resultant thick slurry is then placed in shallow trays and dried in an air oven. Finally the dry polymer is reground to break up agglomeration. Plastisol formulations are prepared, by the procedures described above, from the reground polymer containing, respectively, 63 parts and 97 parts of dioctyl phthalate per 100 parts of coated resin. The plastisols are evaluated as described above for their rheological properties and their heat and light resistance. The plastisols are found to have significantly higher yield values and essentially the same plastic viscosities (flow rate) as a control plastisol prepared from uncoated polymer. The heat and light resistance of thin films prepared from the plastisols containing coated polymer are far superior to those of the controls made from uncoated resin.

Example V

An extremely fine polyvinyl chloride hydrosol type resin, that is, a spray dried latex resin intended to be redispersed in water, having a great preponderance of particles finer than about 0.3 micron, is coated with 0.3 percent sodium polyacrylate by the reslurrying technique of Example IV except that the acrylate-resin suspension is spray dried and the dry, coated resin reground. The rheological properties and heat and light stability of plastisols prepared from the resulting coated resin are greatly improved in the manner heretofore described.

The uncoated, fine hydrosol resin employed in Example V is employed to prepare a hydrosol containing 60 percent solids (resin+plasticizer) according to the following formulation:

| | |
|---|---|
| Resin (uncoated) | 100 |
| GP-261 | 40 |
| Acrylate salt stabilizer | 3 |
| Water | To 60% T.S. |

In the above formulation the salt employed is a low molecular weight, water-soluble sodium polyacrylate and the salt is added to the water along with the plasticizer. The resulting hydrosol is thickened to the extent one would normally expect from adding sodium polyacrylate to an aqueous dispersion and its other rheological properties are normal. Films cast from the hydrosol are somewhat better than the control as regards heat and light resistance but do not approach those laid down from non-aqueous materials containing dry, acrylate salt coated polymer. It appears that the two-phase (plasticizer-water) system interferes with the dispersion of the acrylic salt when the latter is separately added to aqueous systems.

Example VI

Various amounts (0.3 to 3 percent) of sodium polyacrylate are incorporated in a coarse, general purpose grade of polyvinyl chloride by milling and other mastication techniques. No significant improvement in the heat and light stability of the resulting resinous compositions can be detected.

Example VII

In a similar fashion 0.3 to 3 percent of sodium polyacrylate are dissolved in polyvinyl chloride latices, in vinyl chloride methyl acrylate copolymer latices and in vinyl chloride vinylidene chloride copolymer latices. Only the normal thickening effects of sodium polyacrylate are detected on rheological examination. Films laid down from these latices possess somewhat improved heat and light resistance but not of the same order as was demonstrated above for the films derived from non-aqueous plastisols containing dry, coated polymers. It thus appears that the improved rheological properties induced by acrylic salts are unique to non-aqueous systems in which the acrylic salt is present on the individual resin particles as a dried, adherent coating.

Example VIII

A coarse, general purpose grade of polyvinyl chloride resin having particles between 10 and about 200 microns in diameter is treated by the re-slurrying and spray-drying technique with amounts of sodium polyacrylate varying from 0.3 to 3 percent. The resulting coarse, spray dried, coated resin could not be employed to prepare plastisols (since the particles were so large as to settle out of the plasticizer). When masticated dry to form solid resinous compositions, no significant improvement in heat and light resistance is obtained. It is clear that the surface coating of this invention is of importance only for extremely fine resins which can be suspended or dispersed in plasticizers or other non-aqueous media. The heat and light resistance effects noted in Examples VI through VIII indicate that the salt coating must be present as a dried coating on exceedingly small resin particles to be effectively dispersed when the resin is fused.

Example IX

In this example, sodium itaconate, at levels of 0.1, 0.2 and 0.3%, is substituted for the sodium polyacrylate in the procedure of Example I. The sodium itaconate in each case is made up as a 10% solution in water which is then added carefully while agitating the polyvinyl chloride latex until the mixture is homogeneous. The mixture is then spray dried in a concurrent flow spray drier having inlet air temperatures of about 300° F. and exit air temperatures of about 180° F. The dry resins are then made up into plastisols (as in Example I, except no regrinding or ink-milling) and the plastisols employed to cast 20 mil films which are fused at 350° F. The resulting films are water white in color and exhibit original light reflectance values (measure of clarity), respectively, 66%, 70% and 70% as compared to 38% for a tan-colored unstabilized control prepared in the same manner. Samples of these films are placed on aluminum panels and are heated at 350° F. for various periods after each of which the reflectance values are determined by a Photovolt Electrophotometer employing a reference standard of 83%. The data are as follows:

| Heat Period Minutes | Control | 0.1% Na-Itaconate | 0.2% Na-Itaconate | 0.3% Na-Itaconate |
| --- | --- | --- | --- | --- |
| 5 | 64.5 | 53.0 | 62.5 | 65 |
| 15 | 6.0 | 16.5 | 30.5 | 63 |
| 30 | 4.0 | 4.5 | 5.0 | 35 |
| 45 | 3.5 | 4.5 | 4.5 | |
| 60 | 3.5 | 4.0 | 4.0 | |
| 90 | 3.0 | 3.5 | 4.0 | 4 |

Example X

Even more stable is a plastisol resin coated in the manner described with 0.3% sodium succinate. The heat stability of the plastisol film prepared from this resin is as follows:

| Heating Minutes | 0.3% Na-Succinate Reflectance Values |
| --- | --- |
| 5 | 68 |
| 10 | 66 |
| 15 | 59 |
| 20 | 54 |
| 30 | 40 |
| 50 | 15 |
| 90 | 4 |

The film of the sodium succinate coated resin also has very materially improved light resistance as compared to an unstabilized control film. The Fadeometer light stability exposure data are as follows:

| | Control | Percent Na-Succinate |
| --- | --- | --- |
| Initial appearance | Hazy, very light brown. | Hazy—water white. |
| Initial change [1] | 20 hrs | No change (>900 hrs.). |
| Appearance at 400 hrs | Black | Clear. |
| Failure (180° Bend) Hours. | 460 | >900[2]. |
| Appearance | Black | Clear. |

[1] First appearance of a light yellow color in gel spots.
[2] No failure in 900 hours Fadeometer exposure.

Rheological examination of the plastisols prepared from a Na-succinate coated resin shows that its flow properties are not materially different from those of the uncoated control. In some cases the yield point viscosity is double that of the control without a corresponding increase in viscosity or flow rate.

Example XI

In like fashion 0.3 percent sodium citrate is applied to the polyvinyl chloride plastisol resin of Example I according to the procedure of Example I. The coated resin is then converted to a plastisol, films cast therefrom and the light and heat stabilities of the films evaluated. The original appearance of the film is clear and colorless. On Fadeometer aging the initial change occurs at about 240 hours as contrasted to 60 hours for an unstabilized control. At 400 hours the sodium citrate stabilized film has some brown spots, whereas the control has already failed (320 hours—overall black color). Failure on a 180° bend occurs at 780 hours for the sodium citrate stabilized film when the film has only a few black spots therein.

Example XII

In a similar fashion 0.3 percent sodium propionate, 0.3 percent sodium maleate, 0.3 percent sodium crotonate, 0.3 percent sodium laurate, 0.3 percent sodium acetate, 0.3 percent sodium acrylate, 0.3 percent sodium carbonate, and 0.3 percent sodium silicate are employed, respectively, in the procedure of Example I to produce coated polyvinyl chloride plastisol resins. The inorganic carbonate and silicate salts are found to so greatly increase plastisol viscosity that the plastisols are difficult to work with and are of little utility. The organic salts, sodium acetate and sodium laurate, are found to produce very cloudy, poor appearing films of poor stability indicating low compatibility of the salts with the plastisol resin. The plastisol containing sodium laurate coated polymer increases quite rapidly in viscosity on standing. All of the remaining carboxylic acid salts are found to modify the plastisol viscosity and to be heat and/or light stabilizers for the resin, with sodium crotonate being the best stabilizer of the above group.

While we have disclosed certain preferred manners of practicing our invention, we do not thereby desire or intend to limit ourselves solely thereto, for the precise proportions of the materials utilized and the procedures employed may be varied and equivalent chemical materials may be employed, if desired, without departing from the spirit and scope of the invention as defined in the appended claims.

We claim:

1. A dry, granular vinyl chloride plastisol resin consisting of particles, finer than about 5 microns and obtained from the polymerization of a monomeric material containing at least 90% by weight of vinyl chloride, and as a coating on said particles from about 0.1 to about 5% by weight based on said particles of a salt of an acid selected from the class consisting of the 3 to 8 carbon atom saturated monocarboxylic acids and polycarboxylic acids, 3 to 8 carbon atom unsaturated mono- and dicarboxylic acids and their anhydrides, and polymeric forms of said unsaturated mono- and dicarboxylic acids and their anhydrides wherein the said acid and anhydride constitutes at least 50 mol percent of the polymer.

2. A dry, finely-granular polyvinyl chloride plastisol resin consisting of particles finer than about 2 microns having thereon a surface coating consisting of from about 0.1 to about 1% by weight, based on said particles, of a salt of an acid selected from the class consisting of 3 to 8 carbon atom saturated monocarboxylic and polyboxylic acids, the 3 to 8 carbon atom unsaturated mono- and dicarboxylic acids and their anhydrides, and polymeric forms of the 3 to 8 carbon atom unsaturated acids and anhydrides wherein the said acid and anhydride constitutes at least 50 mol percent of the polymer.

3. A resin as defined in claim 2 wherein the said salt is a salt of an alpha-beta unsaturated carboxylic acid.

4. A resin as defined in claim 2 wherein the said salt is a salt of a polycarboxylic acid.

5. A resin as defined in claim 2 wherein the said salt is sodium crotonate.

6. A resin as defined in claim 2 wherein said salt is sodium succinate.

7. A resin as defined in claim 2 wherein said salt is sodium itaconate.

8. A resin as defined in claim 2 wherein said salt in sodium citrate.

9. A dry, finely-granular polyvinyl chloride plastisol resin consisting of particles finer than about 2 microns having thereon a substantially uniform surface coating consisting of between about 0.1 and about 0.6% by weight, based on said resin, of a water-soluble alkali-metal salt of polymerized acrylic acid.

10. A resin as defined in claim 9 wherein the said salt is sodium polyacrylate.

11. A method of preparing a pre-stabilized polyvinyl chloride plastisol resin of modified viscosity characteristics consisting of mixing particles of said resin finer than about 2 microns in water containing between about 0.1 and about 0.6% by weight on the said resin of a salt of an acid selected from the class consisting of the 3 to 8 carbon atom saturated monocarboxylic and polycarboxylic acids, the 3 to 8 carbon atom unsaturated mono- and dicarboxylic acids and their anhydrides, and polymeric forms of said unsaturated mono- and dicarboxylic acids and their anhydrides wherein the said acid and anhydride constitute at least 50 mol percent of the polymer and then removing the said water to produce a dry plastisol resin coated with said salt.

References Cited in the file of this patent

UNITED STATES PATENTS

| | | |
|---|---|---|
| 2,485,270 | Folt | Oct. 18, 1949 |
| 2,520,959 | Powers | Sept. 5, 1950 |
| 2,600,695 | Sans | June 17, 1952 |
| 2,608,547 | Hendricks et al. | Aug. 26, 1952 |
| 2,673,191 | Wolf | Mar. 23, 1954 |
| 2,674,585 | Condo | Apr. 6, 1954 |
| 2,689,836 | Bier | Sept. 21, 1954 |
| 2,705,226 | Bond | Mar. 29, 1955 |
| 2,711,401 | Lally | June 21, 1955 |
| 2,713,563 | Kuhn | July 19, 1955 |
| 2,784,177 | Bessant et al. | Mar. 5, 1957 |